United States Patent Office 3,250,790
Patented May 10, 1966

1

3,250,790
6-O-HIGHER ALKENOYL-ASCORBIC ACID ESTERS AND THEIR PREPARATION
Heinrich Kläui, Riehen, Sidney Frank Schaeren, Bottmingen, and Wolfgang Schlegel, Riehen, Switzerland, assignors to Hoffmann-La Roche Inc., Nutley, N.J., a corporation of New Jersey
No Drawing. Filed Nov. 12, 1963, Ser. No. 323,117
Claims priority, application Switzerland, Nov. 14, 1962, 13,334/62
6 Claims. (Cl. 260—343.7)

This application relates to esters of ascorbic acid, and more particularly, to processes for their preparation.

Partially esterified ascorbic acid wherein the esterification is at the terminal primary hydroxyl group (6-position) with fatty acids are known. Various methods have been proposed for the preparation of these ascorbic acid esters. However, only esterification in the presence of concentrated sulfuric acid at a slightly elevated tempreature has attained any technical significance. The concentrated sulfuric acid has a three-fold function, namely, as a solvent, as a catalyst, and as a water-remover. This process for the esterification of the primary hydroxyl group of ascorbic acid is, however, associated with considerable disadvantages which even appear to increase if the esterification is carried out with an unsaturated fatty acid. These disadvantages include reaction of the sulfuric acid with the double bond of the unsaturated fatty acid and formation of considerable amounts of tar, thus reducing the yield of the desired ester to almost negligible amounts.

Surprisingly, it has now been found that esterification at the primary hydroxyl group (6-position) of ascorbic acid occurs substantially exclusively when the reaction of ascorbic acid and an unsaturated higher fatty acid is carried out in the presence of boron trifluoride.

The process of the invention can also be carried out using isoascorbic acid in place of ascorbic acid. Hence, when the term "ascorbic acid" is used herein, it is to be understood that "isoascorbic acid" can be substituted therefor.

The esterification process of the invention is conveniently carried out in the presence of a solvent which is inert towards boron trifluoride; prefearbly a hydrocarbon, such as an aromatic hydrocarbon, for example, xylene, etc., or a halogenated hydrocarbon such as a halogenated aliphatic hydrocarbon, for example, chloroform, methylene chloride, etc., and most preferably methylene chloride. It is preferred to add to the reaction mixture at least 3 moles (especially about 3.1 to about 3.5 moles) of boron trifluoride per mole of ascorbic acid. The duration of reaction is determined by the reaction temperature chosen. While the reaction duration amounts to several hours at room temperature, the reaction is completed after only a few hours at a slightly elevated temperature, e.g., between about 20 to about 50° C. The preferred temperature is in the range of about 25 to about 35° C.

In order to isolate the reaction product obtained, it is necessary to decompose the ascorbic acid ester-boron trifluoride complex formed by the above reaction, for example, by treatment with a substance which selectively reacts with the boron trifluoride while leaving the ascorbic acid ester unchanged. This selective reaction can be achieved, for example, by controlling the basicity using a weak base (e.g. pyridine) which does not form a salt with the ascorbic acid ester or by slowly adding a stronger base (e.g. ammonia, aqueous solutions of ammonium salts, such as ammonium carbonate, ammonium carbamate, ammonium sulfate) and checking the change of the pH until a value of about 6 to about 6.5 is reached. The same effect can be achieved by adding the basic substance itself (e.g. ammonium carbonate) in approximately equimolar amounts.

2

The substance which effects the decomposition of the complex can be added directly to the reaction mixture. However, it is also possible to first evaporate off the solvent which is present in the reaction mixture and to carry out the decomposition after the addition of another solvent, which is chosen to be particularly useful in the subsequent separation of the reaction products. The decomposition of the boron trifluoride complex is preferably carried out with cooling.

The separation of the liberated ester from the reaction mixture is conveniently effected by dissolution in a solvent in which the boron trifluoride is substantially insoluble or is only very slightly soluble. Methyl ethyl ketone, tetrahydrofuran and isopropyl ether have been found to be suitable as the solvent. The ester dissolves in the solvent, and the solvent layer is separated from the layer containing the boron trifluoride. The ester is then recovered from the solvent layer by distillation of the solvent from the ester. If necessary, fatty acids which may still be present can be removed by washing the ester, for example, with petroleum ether.

The process in accordance with the invention is particularly suitable for the esterification of ascorbic acid with oleic acid; it is, however, also suitable for esterification with the remaining higher unsaturated fatty acids, i.e., unsaturated fatty acids having olefinic unsaturation and having at least 8 carbon atoms, preferably 12 to 20 carbon atoms, e.g., elaidic acid, linoleic acid, linolenic acid, arachidonic acid, etc. A particularly inexpensive product is obtained when technical oleic acid is employed. Technical oleic acid contains about 75 percent oleic acid, and small quantities of linoleic acid, palmitic acid, stearic acid, and other saturated and unsaturated higher fatty acids. It is self-evident that in carrying out the process in accordance with the invention, these by-products also react with ascorbic acid with the esterification of its terminal primary hydroxyl group.

The ester compounds which are prepared according to the process of the invention have reducing properties. The products of the process have a very good antioxidant action so that they are useful for the stabilization of foods or feeds which are susceptible to oxidation. Also, by the use of L-ascorbic acid as the starting material, the products of the process show a vitamin C action which corresponds to their content of L-ascorbic acid.

A further feature of the present invention relates to a process for the stabilization of foods or feeds which are susceptible to oxidation, wherein ascorbic acid which is esterified at the terminal primary hydroxyl group with a higher unsaturated fatty acid is added to these foods or feeds, and to foods and feeds so stabilized.

Of particular significance compared with the saturated fatty acid esters of ascorbic acid hitherto used as antioxidants (such as ascorbyl palmitate in particular) are the solubility properties of the ascorbic acid esters with higher unsaturated acids. The increased solubility of the latter in many solvents is particularly valuable in the stabilization of fats and oils. As is well known, the use of ascorbyl palmitate is associated with the serious disadvantage that this ester can only be dissolved in fats and oils by heating at high temperatures. This dissolving process is always associated with a considerable decomposition of the ascorbyl palmitate and can also bring about a damage of the fats or oils. It has been attempted to reduce this disadvantage by conducting the manufacture thereof while heating a concentrated solution of ascorbyl palmitate in a fat which is solid at room temperature. By the use of this concentrate, the solid melt obtained, after renewed heating and liquefaction, must be added to the fat or oil to be stabilized which is likewise heated. Although the temperatures employed in the addition of the concentrate are not as high as in the manufacture of the concentrate or in the direct solution in the end product, this heating nevertheless results in a decomposition of the ascorbyl palmitate and, in practice, an unwelcome expense.

On the other hand, the ascorbic acid esters with higher unsaturated fatty acids of the invention have the advantage that they can be converted at room temperature into liquid concentrates which can be added without heating to an oil or a liquefied fat. Edible liquid partial glycerides (such as, for example, glycerine monooleate) and liquid mixtures of glycerine monooleates and dioleates and/or glycerine monoricinoleate are suitable for the manufacture of the liquid concentrates. The manufacture of these liquid concentrates can be effected in the cold. It has been found desirable to add thereto a small amount of water and/or ethanol.

A further desirable property of ascorbic acid esters with higher unsaturated fatty acids is their solubilizing and crystallization-preventing ability in liquid glyceride solutions of ascorbic acid esters with higher saturated fatty acids so that it is possible to prepare solutions of higher 6-O-alkanoyl esters of ascorbic acid in liquid glycerides with relatively small quantities of 6-O-alkenoyl esters of ascorbic acid; in most cases, the addition of 5 to 10 percent of ascorbic acid esters with higher unsaturated fatty acids (relative to the total quantity of ascorbic acid esters employed) is sufficient to form a liquid preparation at room temperature. The total quantity of ascorbic acid esters employed, based on the weight of liquid glyceride is in the range of about 5% to about 30%. For example, a mixture of 1 part by weight of each of the following: 6-O-oleoyl-ascorbic acid, 6-O-palmitoyl-ascorbic acid, 6-O-stearoyl-ascorbic acid, 6-O-myristolyl-ascorbic acid, and 6-O-lauroyl-ascorbic acid, in 45 parts by weight of glyceryl monooleate is dissolved by warming to about 45° C. This solution remains liquid at room temperature, while the same preparation without 6-O-oleoyl-ascorbic acid crystallizes within a short time after cooling.

The liquid concentrates obtained can be used for increasing the stability of vegetable oils and fats which already have a fixed content of natural antioxidants, especially tocopherols. In the stabilization of animal fats, the addition of topcopherol and, in particular, of $\gamma$-tocopherol or other antioxidants is preferred. The antioxidative activity of the liquid concentrates can be strengthened by the addition of small quantities of synergists such as citric acid, lecithin and amines such as colamine, spermine, spermidine, diethanolamine, proline, and the like. On physiological grounds it is convenient to use amines and amino acids (such as, for example, proline) occurring in nature and having synergistic properties.

In the following examples all temperatures are given in degree centigrade.

*Example 1*

52.8 g. of ascorbic acid, 90.0 g. of oleic acid and 550 ml. of methylene chloride are added to a reaction vessel which is provided with a thermometer, stirrer, gas-inlet tube and distillation attachment. In order to remove all traces of water, 200 ml. of methylene chloride are distilled off while stirring and carefully heating to 50°. The mixture is cooled down to 20° and the distillation attachment is replaced by a reflux condenser. Then, boron trifluoride is introduced slowly through the gas-inlet tube into the reaction vessel, whereby by regulation of the current of gas, the temperature is controlled so that it does not exceed 30°. After about 5 hours the solution is saturated with boron trifluoride. The resulting viscous brown-colored mixture is left to stand overnight. Then it is cooled to 5° and treated dropwise with 100 ml. of 15 percent aqueous sodium sulfate solution and 100 ml. of 30 percent aqueous ammonium carbamate solution, whereby care is taken that the temperature does not exceed 25°. The thick paste formed is treated with 400 ml. of methyl ethyl ketone (the methyl ethyl ketone can also be added simultaneously with the sodium sulfate and ammonium carbamate solution). The reaction mixture obtained is stirred in the cold for 15 to 30 minutes and extracted three times with 400 ml. of methyl ethyl ketone each time. After thoroughly washing with 15 percent sodium sulfate solution, drying over anhydrous sodium sulfate and filtration, there is obtained a yellow-colored solution which is evaporated in a vacuum at a temperature which does not exceed 40° C. The residual solvent is removed under high vacuum. There is thus obtained a foamy residue which is then covered over with 500 ml. of petroleum ether (boiling range 30–60°) and left to stand overnight. The suspension obtained is filtered off under suction, washed twice with 100 ml. of petroleum ether each time and the filter residue dried in a high vacuum at room temperature. The 6-O-oleoyl-ascorbic acid obtained is a bright yellow-colored, amorphous, hygroscopic material which is completely soluble in alcohol and acetone and colloidally soluble in water. In the thin-layer chromatogram and with the use of Kieselgel as the adsorbant and toluene/methanol/(acetic acid) (85:12.5:2.5) as the eluting agent, there is obtained an $R_f$-value of 0.38.

*Example 2*

1 part by weight of L-proline is dissolved in 2 parts by weight of water and added to 22 parts by weight of anhydrous ethanol, 10 parts by weight of 6-O-oleoyl-ascorbic acid and 5 parts by weight of $\gamma$-tocopherol. The mixture obtained is treated with 62 parts by weight of glycerine monooleate, whereby there is obtained a clear yellow solution. The solution can be mixed with fats and oils without further treatment.

(a) 0.3 part by weight of the solution obtained above is mixed with 100 parts by weight of sunflower oil while stirring. This oil and an untreated control sample is stored at 45°. After 40 days the peroxide number of the untreated oil is 31, while that of the oil treated with the antioxident concentrate is 12.

(b) 0.3 part by weight of the solution obtained above is mixed with 100 parts by weight of a lard which is liquefied by heating. Upon storing this fat at 45° the peroxide number amounts to 3 after 42 days, while it is 50 with a similarly stored untreated fat.

The antioxident concentrate obtained can be distributed by slight shaking in 0.2 percent sodium carbonate solution with the formation of a milky liquid which is suitable as an additive to milk, sausages, salad creams, potato powder, etc.

In the previously described preparation, the content of ascorbyl oleate can be doubled or tripled without difficulty. The $\gamma$-tocopherol can be omitted or replaced by other tocopherols ($\alpha$-tocopherol or mixtures) or other antioxidants.

*Example 3*

1 part by weight of colamine is dissolved in 10 parts by weight of anhydrous ethanol and 10 parts by weight of 6-O-oleoylascorbic acid, and 5 parts by weight of $\gamma$-tocopherol are added thereto. The mixture obtained is mixed until homogeneous under gentle warming and 75 parts by weight of glycerine monoricinoleate added whereupon a clear yellow solution results which, without further treatment, can be mixed with fats and oils and possesses very good antioxidant properties.

*Example 4*

52.8 g. of iso-ascorbic acid are worked up according to the method described in Example 1. The 6-O-oleoyl-isoascorbic acid thus obtained is a brown-yellow, amorphous, hygroscopic material, which is completely soluble in alcohol and acetone and colloidally soluble in water. In the thin-layer chromatogram and with the use of Kieselgel as the adsorbant and toluene/methanol/(acetic acid)

(85:12.5:2.5) as the eluting agent, there is obtained an $R_f$-value of 0.38.

We claim:
1. A process for the preparation of an ester of a compound selected from the group consisting of ascorbic acid and isoascorbic acid esterified in the 6-position with a higher olefinically unsaturated fatty acid comprising the steps of
    (a) reacting a compound selected from the group consisting of ascrobic acid and isoascorbic acid with a higher olefinically unsaturated fatty acid in the presence of boron trifluoride to form an ester-boron trifluoride complex, and
    (b) decomposing said complex.
2. A process according to claim 1 wherein said reaction is carried out in the presence of a solvent inert to boron tirfluoride.
3. A process according to claim 1 wherein at least 3 moles of boron trifluoride are employed per mole of said compound.
4. A process according to claim 1 wherein oleic acid is employed as the fatty acid.
5. An ester of a compound selected from the group consisting of ascorbic acid and isoascorbic acid in the 6-position with a higher olefinically unsaturated fatty acid.
6. 6-O-oleoyl-ascorbic acid.

References Cited by the Examiner

UNITED STATES PATENTS

| | | | |
|---|---|---|---|
| 2,350,435 | 6/1944 | Wells et al. | 260—343.7 |
| 2,454,748 | 11/1948 | Weisblat et al. | 260—343.7 |
| 2,454,749 | 11/1948 | Wise | 260—343.7 |
| 2,790,721 | 4/1957 | Toulmin | 99—150 |
| 2,964,410 | 12/1960 | Kinsman | 99—151 |
| 2,967,772 | 1/1961 | Willems et al. | 96—66 |
| 3,132,154 | 5/1964 | Meyer-Doring | 260—343.7 |

FOREIGN PATENTS 639,776  12/1936  Germany.

OTHER REFERENCES

Booth et al.: Boron Trifluoride and Its Derivatives, John Wiley and Sons, New York (1949), pages 185–187.

Grun Berichte, vol. 38 (1905), pages 2284–6.

Swern et al.: Oil and Soap (November 1943), pages 224–6.

Migrdichian: Organic Synthesis, Reinhold Pub. Corp., New York (1957), pages 322 and 323.

Groggins: Unit Processes in Organic Chemistry, McGraw-Hill Book Co., New York (1958), pages 699–701.

WALTER A. MODANCE, *Primary Examiner.*

NICHOLAS S. RIZZO, J. A. PATTEN,
*Assistant Examiners.*